(12) United States Patent
Hiraya et al.

(10) Patent No.: US 6,425,367 B1
(45) Date of Patent: Jul. 30, 2002

(54) COMPRESSION SELF-IGNITION GASOLINE INTERNAL COMBUSTION ENGINE

(75) Inventors: Koji Hiraya, Yokohama; Akihiro Iiyama, Kanagawa; Tomonori Urushihara, Yokohama; Kazuya Hasegawa; Tsuyoshi Taniyama, both of Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 90 days.

(21) Appl. No.: 09/661,408

(22) Filed: Sep. 13, 2000

(30) Foreign Application Priority Data

Sep. 17, 1999 (JP) .......................... 11-264520
Jan. 25, 2000 (JP) ...................... 2000-015731

(51) Int. Cl.$^7$ ..................... F02D 19/08; F02B 1/12
(52) U.S. Cl. ................. 123/299; 123/305; 123/90.15; 701/104
(58) Field of Search ................ 123/299, 300, 123/305, 90.15, 90.16, 90.17, 480, 486; 701/103, 104

(56) References Cited

U.S. PATENT DOCUMENTS

| | | | |
|---|---|---|---|
| 5,220,904 A | * 6/1993 | Miyashita et al. | ....... 123/90.16 |
| 5,427,069 A | * 6/1995 | Tomisawa et al. | .......... 123/478 |
| 5,535,716 A | 7/1996 | Sato et al. | ................... 123/279 |
| 5,967,114 A | * 10/1999 | Yasuoka | ..................... 123/295 |
| 6,267,097 B1 | * 7/2001 | Urushihara et al. | ......... 123/299 |
| 6,305,364 B1 | * 10/2001 | Ma | ............................. 701/104 |
| 6,336,436 B1 | 1/2002 | Miyakubo et al. | .......... 123/295 |
| 6,354,264 B1 | 3/2002 | Iwakiri et al. | .............. 123/305 |
| 2001/0015192 A1 | * 8/2001 | Urushihara et al. | ......... 123/299 |

FOREIGN PATENT DOCUMENTS

| | | | |
|---|---|---|---|
| JP | 10-252476 | * 9/1998 | .......... F02B/23/06 |
| JP | 10-266878 | 10/1998 | |

* cited by examiner

*Primary Examiner*—John Kwon
*Assistant Examiner*—Hieu T. Vo
(74) *Attorney, Agent, or Firm*—Foley & Lardner

(57) ABSTRACT

In a compression self-ignition gasoline internal combustion engine, a fuel injector through which a gasoline fuel is injected uninterruptedly within a combustion chamber of an engine cylinder is provided, a mixture of air and gasoline fuel within the combustion chamber is self-ignited through a compression action of a piston, an intake valve an open timing of the intake valve is set to a mid-way point through a suction stroke of the piston, a closure timing of an exhaust valve is set to a mid-way point through an exhaust stroke thereof, and gasoline fuel injection timing and quantity per combustion cycle injected through the fuel injector is controlled in such a manner that a first gasoline fuel injection is set during a minus valve overlap time interval during which both of exhaust and intake valves are closed and a second gasoline fuel injection is set during at least one of the suction stroke and the subsequent compression stroke.

20 Claims, 13 Drawing Sheets

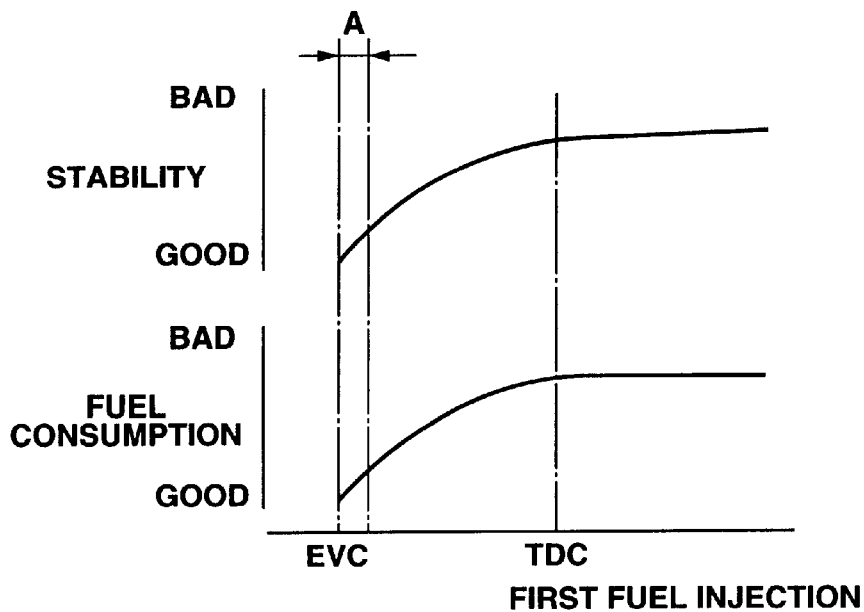
FIG.3A
FIG.3B
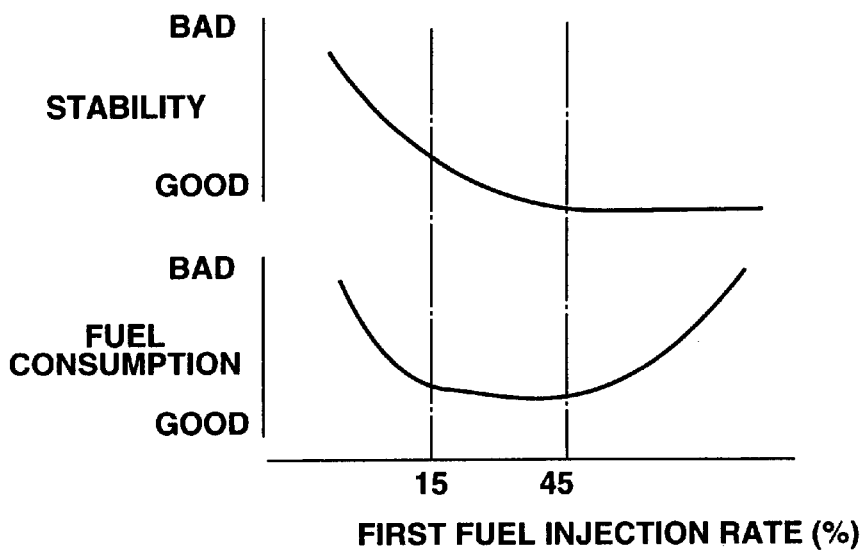
FIG.4A
FIG.4B

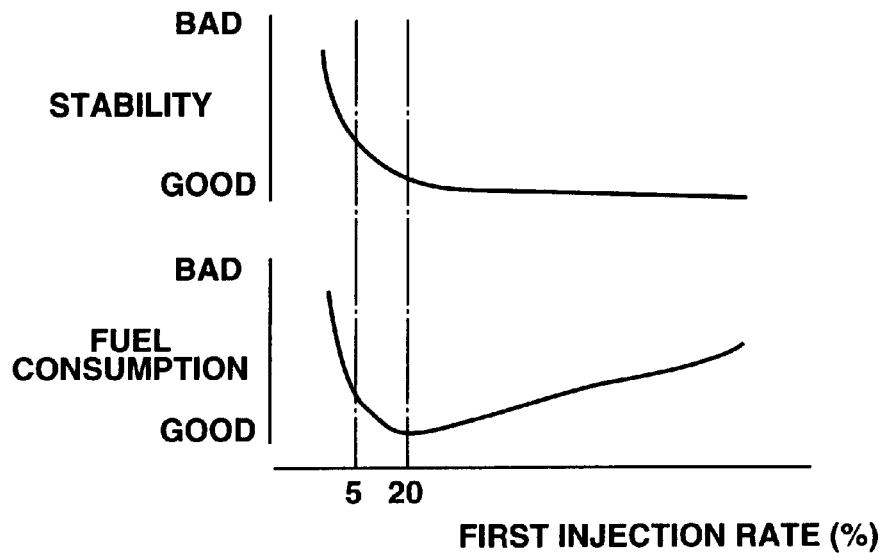

FIG.12
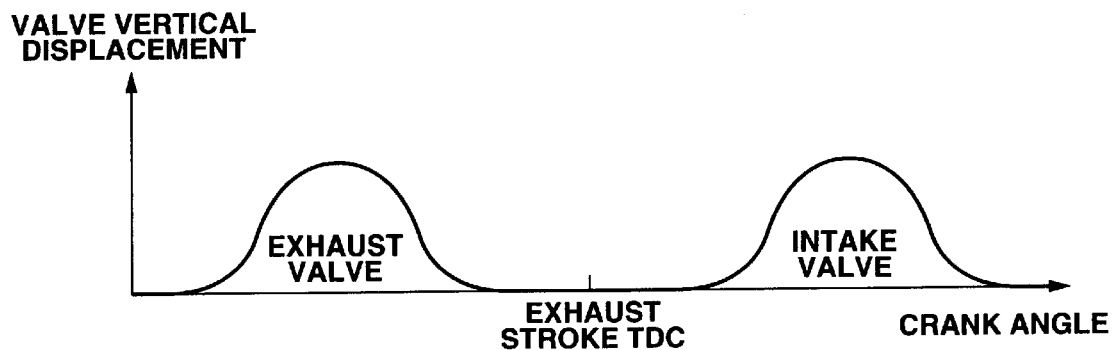
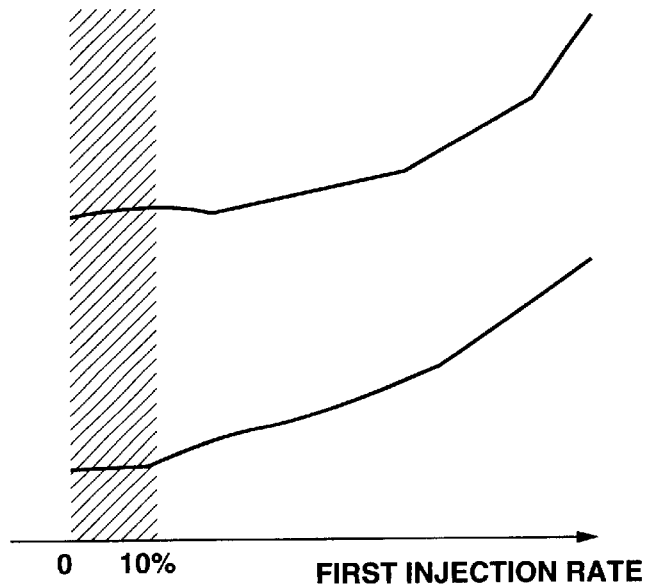
FIG.13A COMBUSTION STABILITY
FIG.13B FUEL COMBUSTION

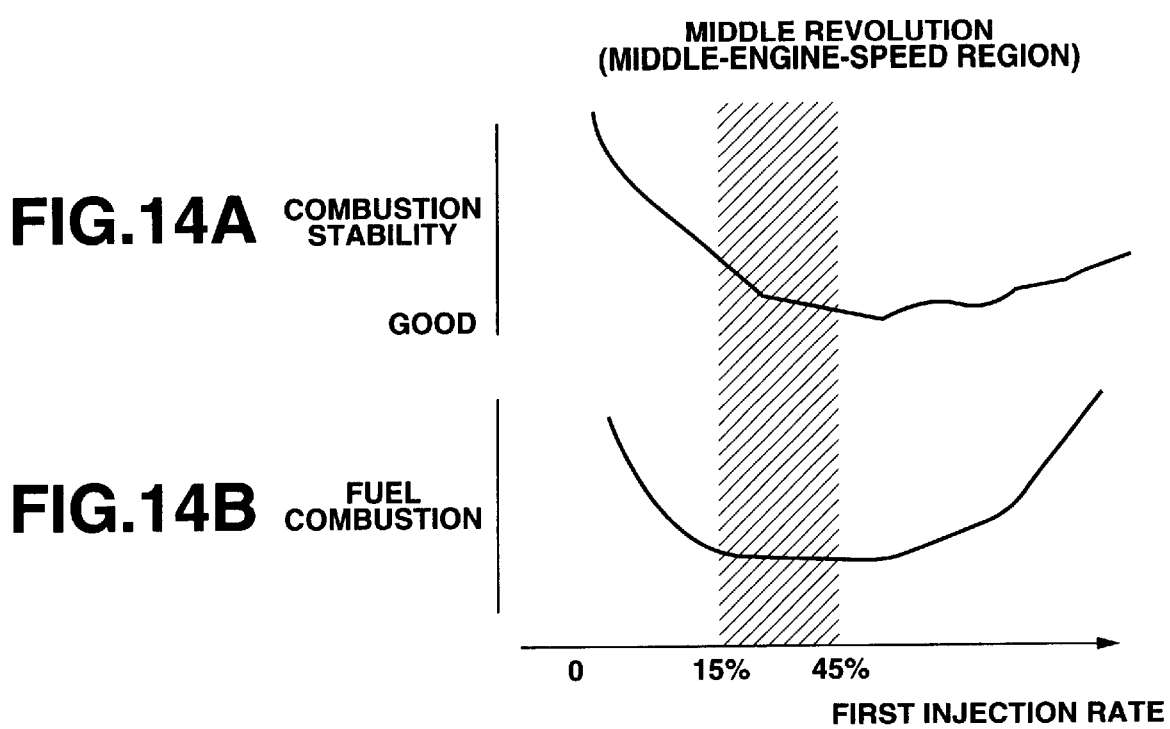
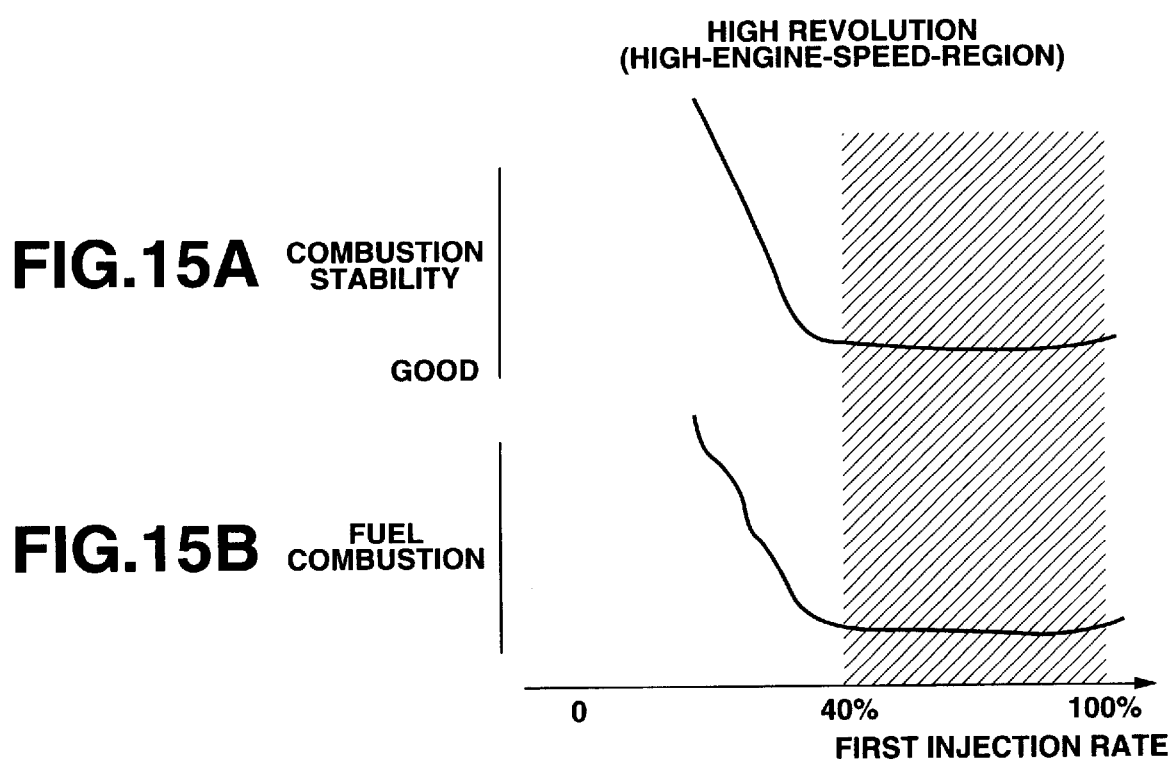

COMPRESSION SELF-IGNITION GASOLINE INTERNAL COMBUSTION ENGINE

BACKGROUND OF THE INVENTION

1. Field of the Invention

The present invention relates to a direct-injection compression self-ignition gasoline internal combustion engine having a fuel injector through which fuel is uninterruptedly (directly) injected into a combustion chamber of an engine cylinder and a piston whose compression action causes an air-mixture gasoline fuel within the combustion to be ignited by itself (self-ignition).

2. Description of the Related Art

Since, in a generally available gasoline internal combustion engine, when the air-mixture fuel is leaned to save a fuel consumption, a combustion due to a spark ignition through a spark plug and a flame propagation tends to become unstable, there is naturally a limit in the leaning of the air-mixture fuel. In addition, during a lean-burn combustion, a catalytic converter to purify an exhaust gas cannot exhibit its purification, particularly, a reduction action of NOx as high as the combustion which indicates a state of combustion in a combustion chamber at a time of a stoichiometric air-fuel mixture ratio.

To solve the above-described problem, a compression self-ignition gasoline internal combustion engine with a high compression ratio has been proposed which performs a self-ignition combustion caused by a compression action of a piston so as to achieve a lean combustion of the air-mixture fuel of gasoline and a low emission of harmful exhaust component as exemplified by a U.S. Pat. No. 5,535,716 issued on Jul. 16, 1996 (which corresponds to a Japanese Patent Application First Publication No. Heisei 7-332141).

In addition, a Japanese Patent Application First Publication No. Heisei 10-266878 published on Oct. 6, 1998 exemplifies another previously proposed compression self-ignition gasoline internal combustion engine.

In this Japanese Patent Application First Publication No. Heisei 10-266878, an interval of time is provided during which the combustion chamber is tightly closed between a valve-closure timing of an exhaust valve and a valve-open timing of an intake valve in a compression self-ignition drive region set from a low-engine-load region to an middle-engine-load region, a closure timing of the exhaust valve is retarded as the engine load is increased, a valve-open timing of the intake valve is set to be advanced so that the above-described tight closure time interval is gradually shortened. Furthermore, in the low-engine-load region and in a high-engine-load region, the valve-closure timing of the intake valve is made earlier (advanced) and, in the middle-engine-load region, the valve-closure timing thereof is made later (retarded).

Thus, a stable self-ignition drive under the engine load region from the low-engine-load region to the middle-engine-load and the high-engine-load regions becomes possible.

SUMMARY OF THE INVENTION

As the compression self-ignition gasoline internal combustion engine, an in-cylinder direct-ignition type gasoline internal combustion engine has previously been proposed. However, in this case, a mere setting of a fuel injection timing to a time point during a suction stroke of an engine cylinder to mix homogeneously air within the combustion chamber with fuel cannot achieve a favorable combustion stability and which, in turn, narrows a compression self-ignition combustion drive enabling range.

On the other hand, in the other previously proposed self-ignition gasoline engine disclosed in the above-identified Japanese Patent Application First Publication No. Heisei 10-266878, it is necessary to continuously vary the open-and-closure timings of the intake and exhaust valves with the increase in the engine load. A structure of such a continuously variable valve timing mechanism as described above is very complex and is difficult to be actually mounted in the engine. Hence, a reduction in engine reliability and a rise in cost in the manufacture and maintenance thereof cannot be avoided.

It is therefore an object of the present invention to provide a direct-injection compression self-ignition gasoline internal combustion engine which can extend the engine self-ignition combustion drive enabling range, achieving improvements in an intake-air charging efficiency and in a fuel saving and which can achieve a stable self-ignition combustion over a wide self-ignition combustion engine drive enable range with an improved self-ignitability without necessity of a complex continuously variable valve timing mechanism which would increase a manufacturing cost and maintenance cost and would reduce an engine reliability.

According to one aspect of the present invention, there is provided a compression self-ignition gasoline internal combustion engine, comprising: a fuel injector through which gasoline fuel is injected uninterruptedly within a combustion chamber of an engine cylinder; a piston of the engine cylinder whose compression action causes a mixture of air with gasoline fuel within the combustion chamber to be self-ignited; an intake valve whose open timing is set to a mid-way point through a suction stroke of the piston; an exhaust valve whose closure timing is set to a mid-way point through an exhaust stroke thereof; and a fuel injection controlling section that controls gasoline fuel injection timing and quantity per a combustion cycle injected through the fuel injector in such a manner as to set a first gasoline fuel injection to be carried out during a minus valve overlap interval during which both of the exhaust and intake valves are closed and as to set a second gasoline fuel injection to be carried out during at least one of the suction stroke and the subsequent compression stroke.

According to another aspect of the present invention, there is provided a compression self-ignition gasoline internal combustion engine, comprising: fuel injection means for directly injecting a gasoline fuel into a combustion chamber of each engine cylinder; piston means whose compression action causes a mixture of air with gasoline fuel within the combustion chamber to be self-ignited; intake valve means whose open timing is set to a mid-way point through a suction stroke of the piston means in a corresponding engine cylinder; exhaust valve means whose closure timing is set at a mid-way point of an exhaust stroke; fuel injection timing setting means for setting a timing of a first fuel injection carried out through the fuel injection means to a time point during a minus valve overlap interval during which both of intake and exhaust valves of each engine cylinder are closed and for setting that of a second fuel injection carried out through the fuel injection means to a time point during at least one of the suction stroke and the subsequent compression stroke, whereby the first and second fuel injections are carried out through the fuel injection means within the same combustion cycle.

According to a still another aspect of the present invention, there is provided a method applicable to a compression self-ignition gasoline internal combustion engine, comprising: providing a fuel injector through which gasoline fuel is injected uninterruptedly within a combustion chamber of an engine cylinder; providing a mixture of air and gasoline fuel within the combustion chamber to be self-ignited through a compression action of a piston of the engine cylinder; providing an intake valve whose open timing is set to a mid-way point through a suction stroke of the piston; providing an exhaust valve whose closure timing is set to a mid-way point through an exhaust stroke thereof; and controlling gasoline fuel injection timing and quantity per combustion cycle injected through the fuel injector in such a manner that a first gasoline fuel injection is set during a minus valve overlap time interval during which both of exhaust and intake valves are closed and a second gasoline fuel injection is set during at least one of the suction stroke and the subsequent compression stroke.

This summary of the invention does not necessarily describe all necessary features so that the invention may also be a sub-combination of these described features.

BRIEF DESCRIPTION OF THE DRAWINGS

FIGS. 3A and 3B are integrally a characteristic graph of the compression self-ignition gasoline internal combustion engine shown in FIG. 1A representing a relationship of a timing of a first fuel injection to a combustion stability and a fuel consumption under an low-engine-load condition.

FIGS. 4A and 4B are characteristic graphs of the compression self-ignition gasoline internal combustion engine shown in FIG. 1A representing relationships of a rate of an injection quantity at a first fuel injection to a gross fuel injection quantity which is a sum of the injection quantities of the first fuel injection and a second fuel injection injected at a second fuel injection under the low-engine-load condition of the self-ignition engine in FIG. 1A to the combustion stability and the fuel consumption.

FIGS. 5A and 5B are characteristic graphs of the compression self-ignition gasoline internal combustion engine shown in FIG. 1A representing a relationship of the rate of the first fuel injection quantity injected at a first fuel injection to the gross fuel injection quantity which is a sum of the first fuel injection quantity and the second fuel injection quantity injected at a second fuel injection under a engine drive condition including a middle-engine-load condition and a high-engine-load condition at which the compression self-ignition is possible in the self-ignition engine in FIG. 1A to the combustion stability and to the fuel consumption.

FIGS. 6A and 6B are characteristic graphs of the compression self-ignition gasoline internal combustion engine shown in FIG. 1A representing a relationship of the timing of the first fuel injection under the engine drive condition including the middle-engine-load condition and a high-engine-load condition at which the compression self-ignition is possible in the self-ignition engine in FIG. 1A to the combustion stability and to the fuel consumption.

FIG. 12 is a valve timing explanatory view representing the open-and-closure timings of the intake valve and the exhaust valve in the case of the third embodiment shown in FIG. 11.

FIGS. 13A and 13B are characteristic graphs representing the combustion stability and fuel consumption with respect to the rate of the quantity injected at the first fuel injection to the gross fuel injection quantity under a low-engine-speed region of the engine drive condition in the case of the third embodiment shown in FIG. 11.

FIGS. 14A and 14B are characteristic graphs representing the combustion stability and fuel consumption with respect to the rate of the quantity at the first fuel injection to the gross fuel injection quantity under a middle-engine-speed region of the engine drive condition in the case of the third embodiment shown in FIG. 11.

FIGS. 15A and 15B are characteristic graphs representing the combustion stability and fuel consumption with respect to the rate of the quantity at the first fuel injection to the gross fuel injection quantity under a high-engine-speed region of the engine drive condition in the case of the third embodiment shown in FIG. 11.

DETAILED DESCRIPTION OF THE PREFERRED EMBODIMENTS

Reference will hereinafter be made to the drawings in order to facilitate a better understanding of the present invention.

Before explaining a first preferred embodiment of a compression self-ignition gasoline internal combustion engine, each valve timing of both of the exhaust and intake valves of the normal gasoline internal combustion engine and of the self-ignition gasoline internal combustion engine will be described below with reference to FIGS. 10A and 10B.

Figure 10A:
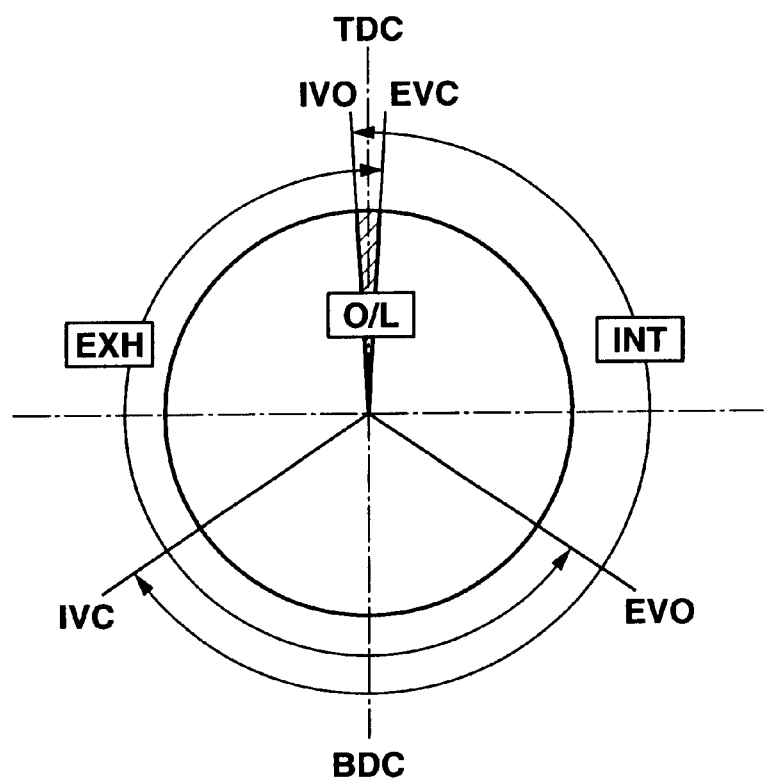
FIGS. 10A and 10B are valve timing explanatory views representing valve open-and-closure timings of intake and exhaust valves of the engine, FIG. 10A representing that a valve closure timing of the exhaust valve and a valve open timing of the intake valve are placed in a vicinity to a piston top dead center so that a predetermined valve overlap (O/L) is set and FIG. 10B representing that a minus valve overlap (which can be abbreviated as a minus valve O/L) interval is set in which both of the intake and exhaust valves are completely closed.

As shown in FIG. 10A, both of a valve-closure timing EVC of an exhaust valve ETH and a valve-opening timing IVO of an intake valve INT are placed in a proximity to a top dead center TDC to which its corresponding piston has reached so that a predetermined valve overlap (O/L in FIG. 10A) is set.

On the other hand, the valve timings of the intake and exhaust valves ETH and INT are set to provide a valve timing of, so-called, a minus valve overlap (MINUS O/L in FIG. 10B) such that the valve-closure timing EVC of the exhaust valve is in a midway through an exhaust stroke, the valve-open timing IVO of the intake valve is in a midway through a suction stroke, and both of the exhaust and intake valves are closed together. That is to say, with respect to the valve timing shown in FIG. 10A, the closure timing EVC of the exhaust valve is advanced (in terms of a crank angle) toward a midway through the exhaust stroke and, at the same time, the open timing EVO of the exhaust valve is retarded (in terms of the crank angle) at a timing near to a bottom top dead center BTDC to which the piston has reached (BDC in FIGS. 10A and 10B). For the intake valve, the open timing IVO is retarded so that a time interval from the closure timing EVC of the exhaust valve to a piston upper top dead center TDC is approximately equal to a time interval from the piston upper top dead center TDC to the open timing IVO of the intake valve. In addition, the closure timing IVC of the intake valve is simultaneously advanced at a timing near to the piston bottom dead center BTDC. At this time, the valve overlap placed in the vicinity to the piston upper dead center TDC is not present but the minus O/L is present.

Since such a time interval of a minus O/L as described above is provided, a combusted gas not exhausted from the combustion chamber is tightly closed and compressed. An originally high-temperature combustion gas becomes further high. Fuel is, then, injected during the minus overlap time interval. A gasification of the injected fuel is promoted by means of a residual combusted gas. As compared with a case where fuel is merely and only injected during the suction stroke, an ignitability could be improved.

However, if a whole quantity of a required fuel injection quantity per a combustion cycle is injected only during the minus valve O/L interval, a temperature rise within each corresponding cylinder occurs. Hence, the intake-air charging efficiency is reduced and the fuel consumption is reduced.

First Embodiment

Figure 1A:
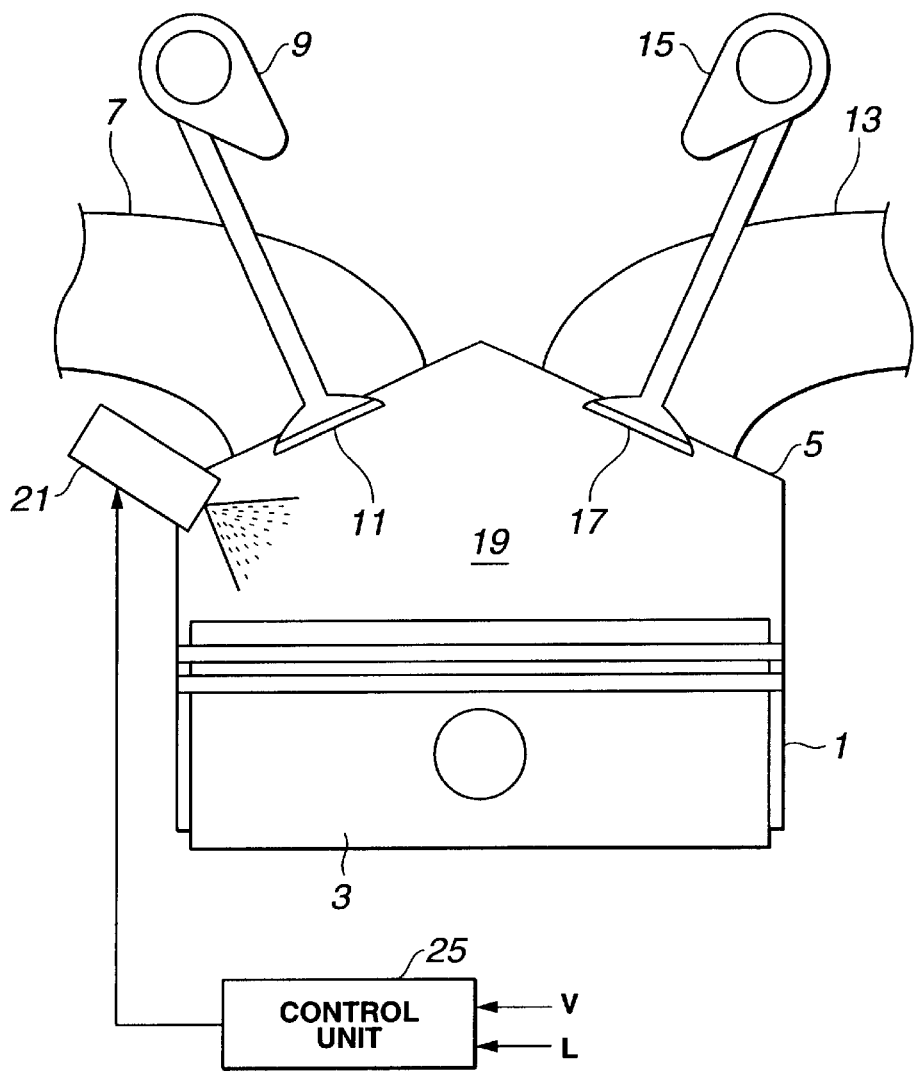
FIG. 1A is a schematic configuration of a compression self-ignition gasoline internal combustion engine in a first preferred embodiment according to the present invention.

FIG. 1A is a whole configuration view of a compression self-ignition gasoline internal combustion engine in the first preferred embodiment according to the present invention.

A piston 3 is movably (reciprocative motion) housed within a cylinder block 1 in a vertical direction.

It is noted that the same structure of the engine as shown in FIG. 1A is applicable to each of other cylinder blocks.

A cylinder head 5 is provided with an intake valve 11 which opens and closes an intake port 7 by means of an intake cam 9 and an exhaust valve 17 which opens and closes an exhaust port 13 by means of an exhaust cam 15.

A fuel injector 21 which injects directly (or uninterruptedly) gasoline fuel into a combustion chamber 19 is disposed in cylinder block 1 placed in a vicinity to the intake port 7 of the cylinder head 5.

A fuel injection operation of the fuel injector 21 is controlled by means of a control unit 25.

Figure 1B:
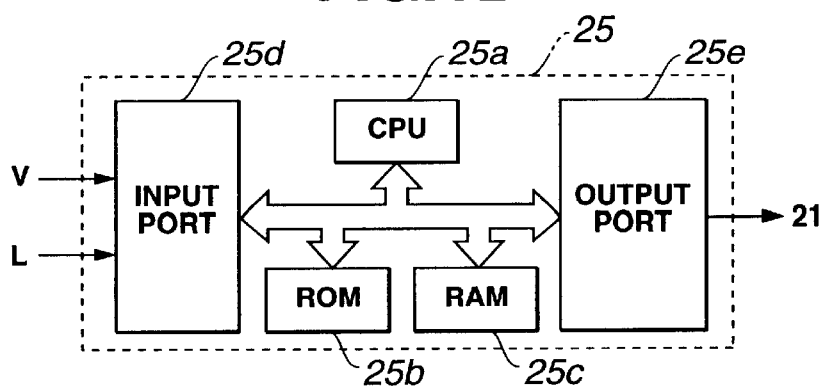
FIG. 1B is a schematic circuit block diagram of a control unit (ECU) shown in FIG. 1A.

The control unit 25 includes a microcomputer generally having a CPU (Central Processing Unit) 25a, a ROM (Read Only Memory) 25b, a RAM (Random Access Memory) 25c, an Input Port 25d, an Output Port 25e, and a common bus as shown in FIG. 1B.

A fuel injection timing and a fuel injection quantity for the combustion chamber 19 are controlled by means of control unit 25 in response to each open/closure timing signal V of intake valve 17 and an engine load signal L.

Figure 10B:
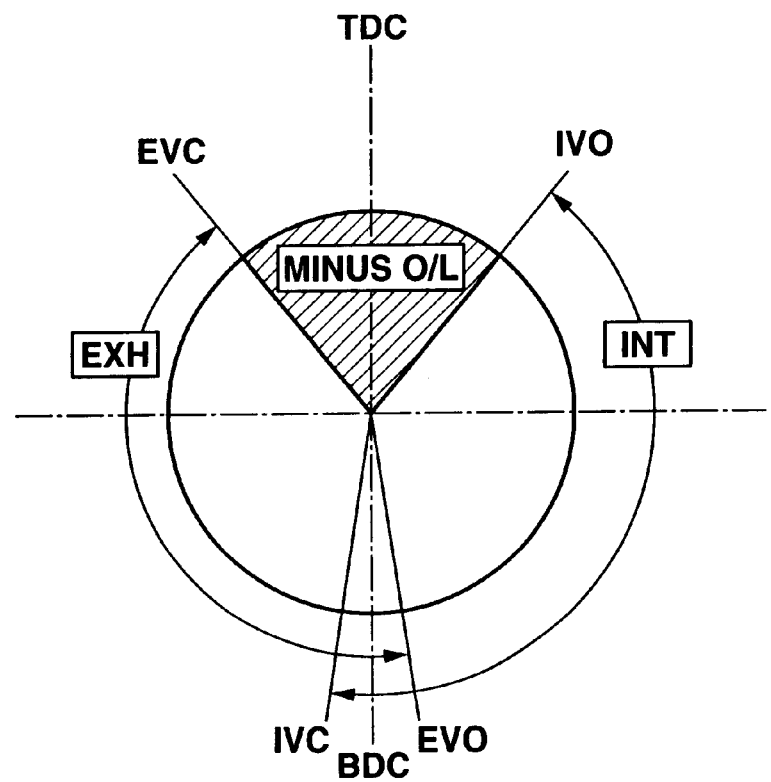

Both of intake cam 9 and exhaust cam 15 are operated for intake valve 11 and exhaust valve 17 to have a valve timing such that the minus valve overlap (minus valve O/L) interval as shown in FIG. 10B is generated. That is to say, both of intake cam 9 and exhaust cam 15 are operated to have the valve timing such that with the closure timing of exhaust valve 17 moved to a midway through an exhaust stroke of corresponding piston and the open timing of intake valve 11 moved to a midway through a suction stroke thereof, both of exhaust valve 17 and intake valve 11 being closed together during the minus valve O/L interval.

In addition, the gasoline internal combustion engine is set to have a relatively high compression ratio equal to or higher than 12 to enable a compression self-ignition drive.

It is noted that a spark plug generally found in the gasoline internal combustion engine is not provided in the cylinder head 5, as shown in FIG. 1A.

An engine load is determined according to a fuel injection quantity with an intake air quantity approximately constant.

Figure 2A:
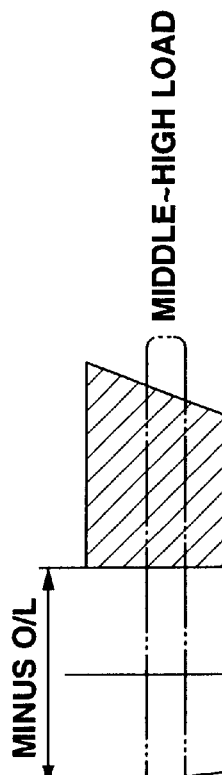
FIGS. 2A, 2B, and 2C are integrally an explanatory view representing valve open-and-closure timings of intake and exhaust valves in the compression self-ignition gasoline internal combustion engine shown in FIG. 1A, a relationship of a settable range of fuel injection timings to an engine load, and a relationship of a fuel injection quantity to the engine load.
Figure 2B:
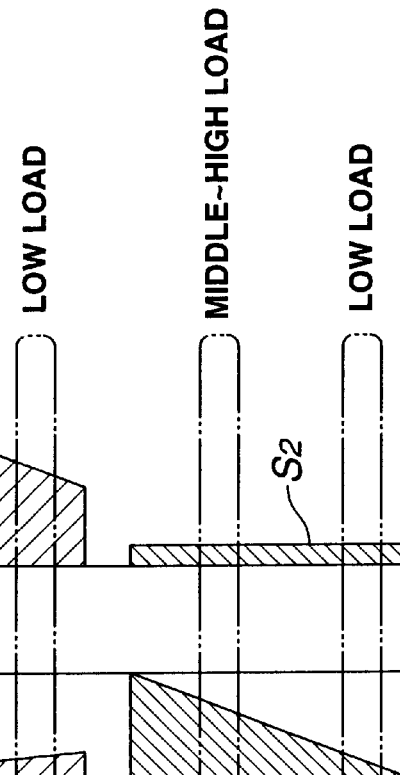
Figure 2C:
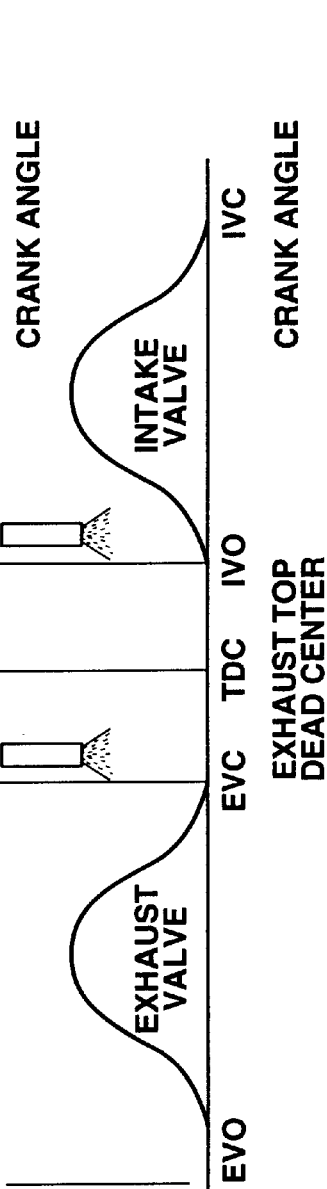

FIGS. 2A, 2B, and 2C integrally show open-and-closure timings of intake valve 11 and exhaust valve 17, a relationship between settable ranges $S_1$ and $S_2$ on the load and fuel injection timings, and a relationship between the load and fuel injection quantities $T_1$ and $T_2$, respectively.

Exhaust valve 17 is closed at EVC but is opened at EVO and intake valve 11 is opened at IVO but is closed at IVC.

An interval between EVC and IVO provides the minus valve O/L interval during which both of intake valve 11 and exhaust valve 17 are closed together.

The fuel injection through fuel injector 21 within combustion chamber 19 is carried out during the minus valve overlap (minus O/L) interval over the settable range which is different according to a load denoted by $S_1$ at a first fuel injection and over settable range $S_2$ as a second fuel injection at an early stage of the suction stroke at which intake valve 11 starts to be opened.

If the minus valve O/L interval is set, the gas after the combustion which is not exhausted from combustion chamber 19 is tightly closed and the combustion gas is compressed with piston 3 moved upward. The originally high-temperature combusted gas becomes further higher temperature due to the compression action through piston 3. Under such a high-temperature atmosphere as described above, the gasoline fuel is injected at the first injection so that a reformation of the injected fuel is advanced.

At this time, a chain of molecules is broken to form a radical and a reaction of the gasoline fuel with a slight quantity of oxygen left in the combusted gas is advanced up to aldehyde. Such a reformation of fuel as described above improves the ignitability and can realize a stable compression self-ignition drive even in a case of a gasoline fuel having less ignitability.

In a case where the gasoline self-ignition combustion is realized under a low-engine-load condition, the fuel injection quantity during the minus valve O/L interval is too little not to advance the reformation of fuel, the ignitability is worsened, the combustion becomes unstable, and the fuel consumption becomes worsened. Conversely, too much fuel injection quantity gives a stable combustion and a sufficient fuel reformation but gives too advance in the fuel reformation. Furthermore, a thermal generation occurs at the time of the minus valve O/L interval. In such a case as described above, an efficiency to take out work from the fuel becomes dropped and the fuel consumption becomes worsened.

In a case where gasoline fuel is injected during the minus valve O/L interval, optimum values are present in both injection timings and fuel injection quantities with the combustion stability and fuel saving taken into consideration.

FIGS. 3A and 3B show relationships among the injection timing of a first fuel injection, the combustion stability, and the fuel consumption under a low-engine-load condition.

According to the graphs in FIGS. 3A and 3B, gasoline fuel is injected over a range denoted by A in FIGS. 3A and 3B at an initial stage of the valve closure timing (EVC) of exhaust valve 17 (this means at a time immediately before the valve closure (EVC) of exhaust valve 17) so that both combustion stability and fuel consumption indicate good (gives favorable values).

FIGS. 4A and 4B integrally show the relationship of a rate of injection quantity at the first fuel injection to a gross fuel injection quantity which takes a sum of the injection quantities of the first and second fuel injections to the combustion stability and to the fuel consumption during the drive condition described above (the low-engine-load condition.

According to the graphs shown in FIGS. 4A and 4B, it will be appreciated that the rate of 15% through 45% to the gross fuel injection quantity is injected at the first injection so that both of the combustion stability and the fuel consumption can become favorable. If the rate to the gross fuel injection quantity is below 15%, both of the combustion stability and fuel consumption (fuel saving) become worsened. If the rate to the gross fuel injection is in excess of 45%, the combustion stability becomes improved but the fuel consumption becomes worsened.

If gasoline fuel injection is carried out during the suction stroke on the second injection of gasoline fuel under the low-engine-load condition, a sufficient load for the engine as a low-engine-load drive can be achieved. This second fuel injection at the initial stage of the suction stroke is carried out so that the injected fuel cools the sucked air (intake-air) and the intake-air charging efficiency is, thus, improved. The fuel injection quantity at the second injection is increased as the engine load is increased, as shown in FIGS. 2A through 2C.

On the other hand, under a drive condition including a middle-engine-load condition up to a high-engine-load condition under which the compression self-ignition is possible, a total (gross) injection quantity which is a sum of the quantities at the first and second fuel injections is increased. Since the ignitability under the above-described driving condition is, in nature, high, the fuel injection quantity injected during the minus valve O/L (minus O/L) interval is extremely less quantity. This extremely less quantity is an optimum.

FIGS. 5A and 5B show the combustion stability and fuel consumption, both with respect to the rate of the first injection quantity to the gross injection quantity under the above-described middle-engine-load condition and the high-engine-load condition.

As shown in FIGS. 5A and 5B, it will be appreciated that the rate of the quantity of the first injection which indicates favorable combustion stability and fuel consumption ranges from 5% to 20%.

If the rate is below 5%, both combustion stability and fuel consumption become worsened. If the rate is in excess of 15%, the favorable combustion stability is resulted but the fuel consumption becomes worsened.

The fuel injection quantity under the middle-engine-load and high-engine-load conditions under which the compression self-ignition drive is possible is reduced as shown in FIGS. 2A through 2C along with the rise in load. Hence, the fuel injection quantity gives an optimum for the first injection quantity under the above driving condition such that the gross injection quantity along with the rise in load is increased and the ignitability is improved.

Suppose that the first injection quantity is zero during the minus O/L interval under the above-described condition, the ignitability does not become stable and the combustion stability becomes worsened.

As the load becomes high, a slight quantity of gasoline fuel is injected at the first injection so that the ignitability becomes stable and the fuel consumption becomes improved.

On the contrary, if the injection quantity at the first injection is increased, the ignitability is too improved to increase a knocking strength and the second injection quantity during the suction stroke is accordingly reduced. Hence, the intake-air charging efficiency is reduced and the fuel consumption is worsened.

Under the drive condition of the middle-engine-load and high-engine-load conditions described above, an effect of fuel deformation is not so needed as in the case of the low load condition. Hence, it is not necessary for the fuel injection timing to be set at an initial stage of the closure timing of exhaust valve 17. The fuel injection may be set at any position from the exhaust valve closure timing (EVC) to the exhaust stroke upper top dead center (TDC). If the fuel injection timing exceeds the exhaust stroke upper top dead center (TDC), the effect of fuel deformation becomes insufficient and both of the combustion stability and the fuel consumption are worsened.

FIGS. 6A and 6B integrally show the relationship of the first fuel injection timing to the combustion stability and the fuel consumption under the engine drive condition from the middle-engine-load condition to the high-engine-load condition at which the compression self-ignition drive is possible.

As shown in FIGS. 6A and 6B, it will be appreciated that even if gasoline fuel is injected at any position over a range denoted by B from an initial stage of the valve closure timing (EVC) of the exhaust valve 17 up to the exhaust stroke upper top dead center (TDC), both of the combustion stability and the fuel consumption are favorable. However, if the first fuel injection timing is at a time after the exhaust stroke upper top dead center, it will be appreciated from FIGS. 6A and 6B that both of the combustion stability and fuel consumption are worsened.

Under the high-engine-load drive condition described above, the gross fuel injection quantity is increased and the ignitability becomes high. Hence, it is not necessary to inject fuel during the minus valve O/L interval. All of the required fuel injection quantities are injected during the suction stroke.

The injection quantity at the second fuel injection under the low-engine-load drive condition and under the middle-engine-load drive condition and high-engine-load condition under which the compression self-ignition is possible is set to be equal to or in excess of half the gross injection quantity. This causes the cooling effect of the intake air due to the gasoline fuel injected at second injection to be increased so that the intake-air charging efficiency is improved.

As described above, during the minus (valve) O/L interval, the whole (gross) fuel injection quantity is once not injected but a less quantity of fuel is injected at the first injection and, thereafter, the remaining fuel injection quantity is injected as the second injection or alternatively the single fuel injection may be carried out only during the suction stroke. Thus, the fuel injection timing and the fuel injection quantity are optimally controlled. Consequently, without addition of special parts and controls, both improvements in the intake-air charging efficiency and in the fuel consumption can be achieved.

A stable combustion driving of the engine shown in FIG. 1A can be assured over the whole load driving range.

Second Embodiment

Figure 7:
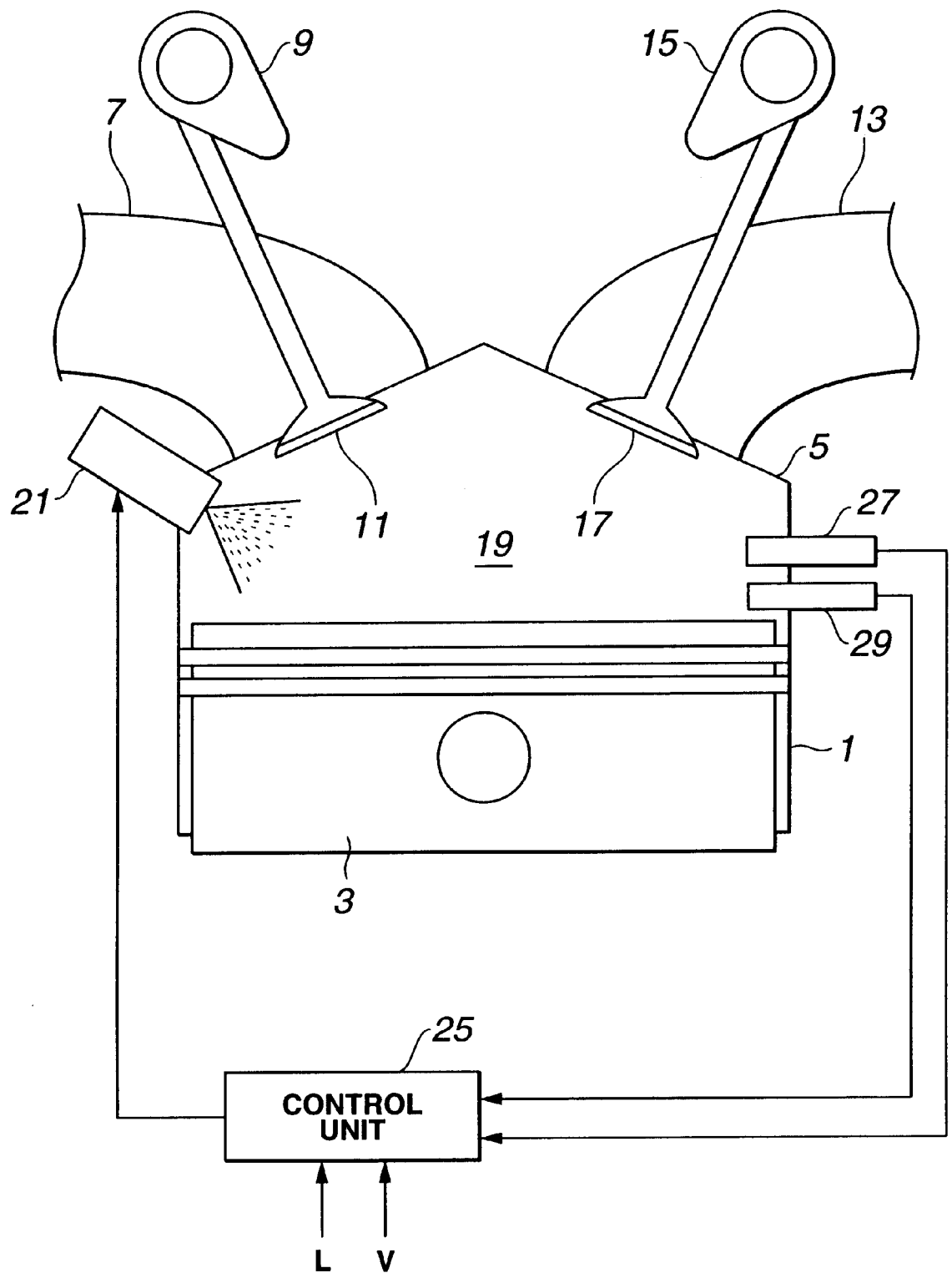
FIG. 7 is a schematic configuration of the compression self-ignition gasoline internal combustion engine in a second preferred embodiment according to the present invention.

FIG. 7 shows a second preferred embodiment of the compression self-ignition gasoline internal combustion engine according to the present invention.

In the second embodiment, a combustion stability sensor 27 to detect the combustion stability and a knocking strength sensor 29 to detect the knocking strength are respectively mounted on cylinder block 1 as shown in FIG. 1A. The fuel injection timing and injection quantity in accordance with the load are basically the same as those in the case of the first embodiment. The stability sensor 27 may be the revolution speed sensor to detect the engine speed, combustion pressure sensor 29 to detect a pressure within the corresponding combustion chamber, or a vibration sensor to detect an engine vibration.

Figure 8:
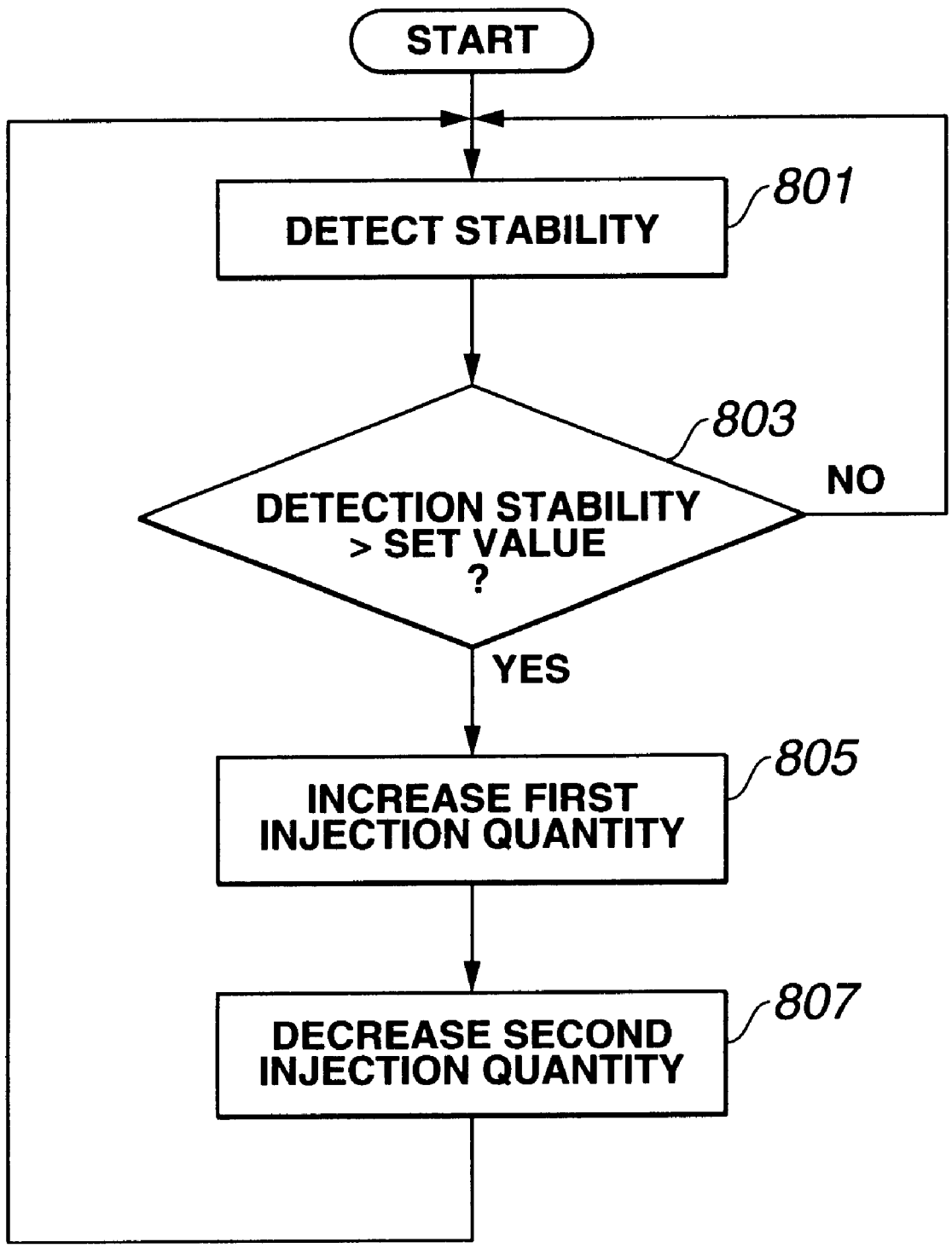
FIG. 8 is an operational flowchart representing a fuel injection control procedure using a combustion stability sensor in the compression self-ignition gasoline internal combustion engine shown in FIG. 7.

FIG. 8 shows an operational flowchart representing a fuel injection control procedure using stability sensor 27.

At a step 801 in FIG. 8, control unit 25 detects and reads the combustion stability by means of stability sensor 27.

At a step 803, control unit 25 determines if the detected combustion stability becomes worse as exceeding as a set value (viz., becomes unstable). If Yes at step 803, the routine shown in FIG. 8 goes to a step 805. At step 803, the routine shown in FIG. 8 goes to a step 805. At step 805, control unit 25 increases the injection quantity at the first injection during the minus valve O/L interval. At the next step 807, control unit 25 accordingly reduces the injection quantity at the second fuel injection during the suction stroke.

Since the fuel injection quantity during the minus valve O/L interval is increased as shown in FIG. 8, a magnitude of fuel reformation is increased and the gasoline fuel ignitability is improved. Thus, the stable combustion can be achieved.

Figure 9:
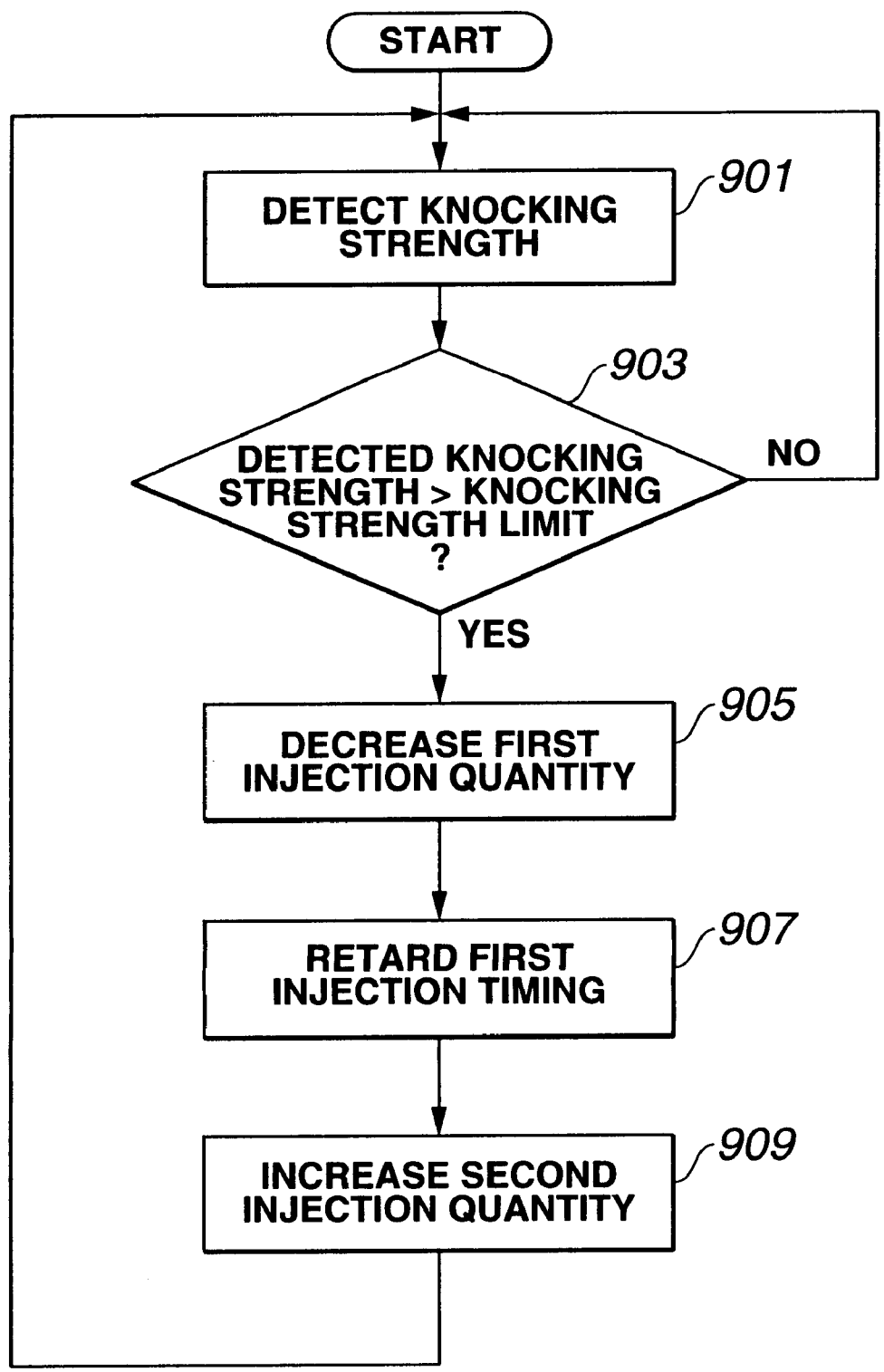
FIG. 9 is an operational flowchart representing a fuel injection control procedure using a knocking strength sensor in the compression self-ignition gasoline internal combustion engine shown in FIG. 7.

FIG. 9 shows a flowchart representing the fuel injection quantity procedure by means of knocking strength sensor 29.

At a step 901, control unit 25 detects and reads the strength of knocking through knocking strength sensor 29.

At the next step 903, control unit 25 determines if the detected strength of knocking is in excess of a limit of the knocking strength.

If Yes at step 903, the routine shown in FIG. 9 goes to a step 905.

At step 905, control unit 25 decreases the fuel injection quantity at the first fuel injection during the minus valve O/L interval.

At the next step 907, control unit 25 retards the fuel injection timing up to the exhaust stroke upper top dead center at maximum.

At a step 909, control unit 25 increases the fuel injection quantity at the second time along with the decrease in the first injection quantity. The temperature within combustion chamber 19 is decreased and the knocking strength is reduced.

In the second embodiment described above, the combustion stability and knocking strength can respectively be controlled by means of combustion stability sensor 27 and knocking strength sensor 29. Hence, a quick correspondence to a transient variation in load can be achieved and a highly responsive driving of the compression self-ignition engine can be achieved.

In addition, even if a minute variation in the drive condition due to a deterioration of fuel injector 21 and due to an adhesion of carbon to a wall of combustion chamber 19, namely, an aging variation of the internal combustion engine occurs. The combustion stability and knocking strength are sequentially controlled so that the stable compression self-ignition driving which can easily respond to the aging variation can be achieved.

Third Embodiment

Figure 11:
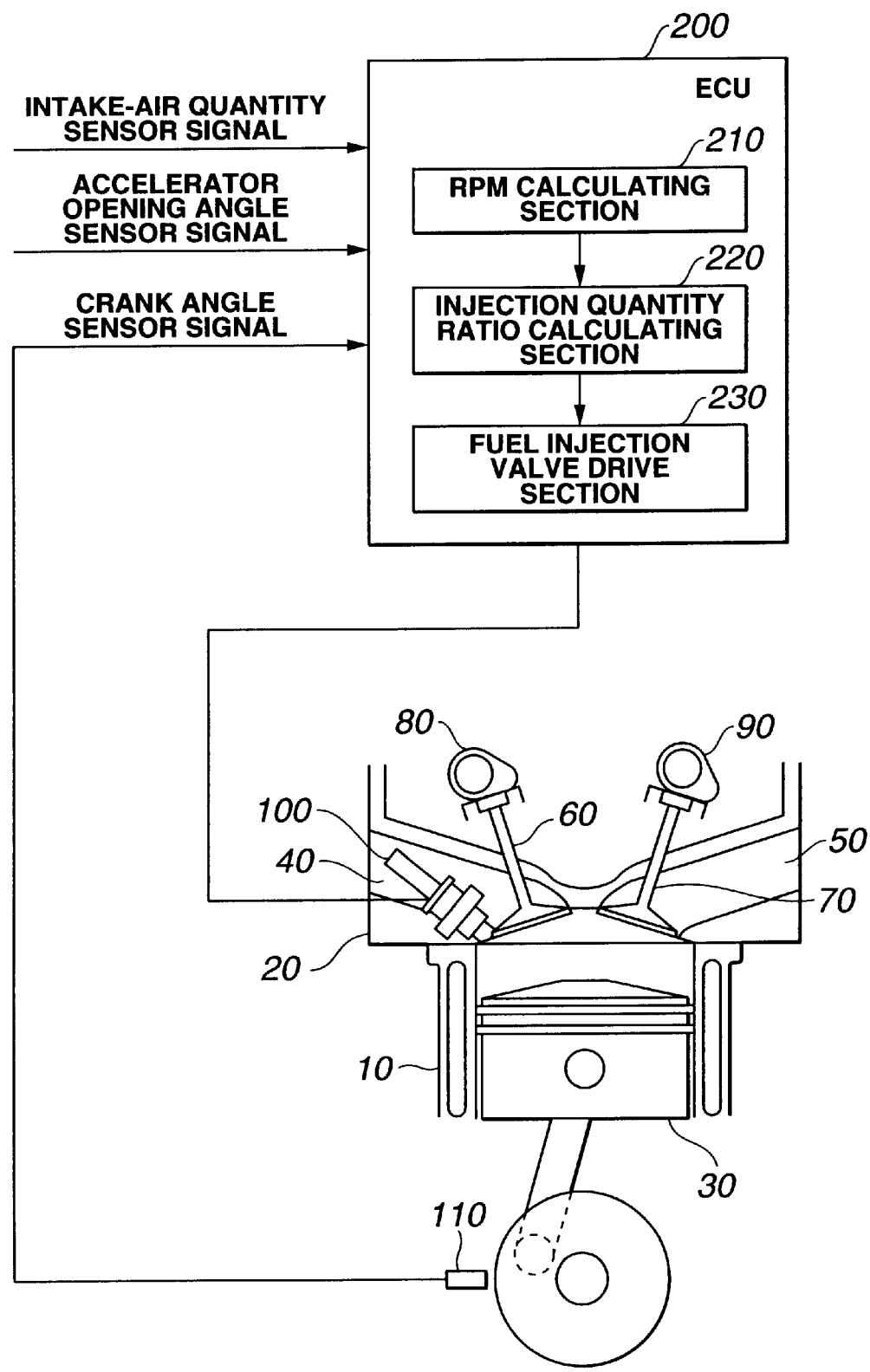
FIG. 11 is a schematic circuit block diagram of the compression self-ignition gasoline internal combustion engine in a third preferred embodiment according to the present invention.

FIG. 11 shows a third preferred embodiment of the compression self-ignition gasoline engine internal combustion engine according to the present invention.

The compression self-ignition gasoline internal combustion engine, in the third embodiment, includes: cylinder 10; cylinder head 20; piston 30; intake port 40; exhaust port 50; intake valve 60, exhaust valve 70; intake cam 80 to drive exhaust valve 40; fuel injector 100 to inject fuel of gasoline directly into combustion chamber; a crank angle sensor 110 to output a pulse train signal in synchronization with a crankshaft revolution; and control unit 200 (hereinafter, referred simply as ECU (ECU is an abbreviation for Engine Control Unit) which controls the fuel injection quantity and fuel injection timing for fuel injector 100 of cylinder 10.

ECU 200 functionally includes: an rpm calculating section 210 that calculates the engine speed (for example, in an rpm (revolution per minute)) on the basis of a crank angle sensor signal (pulse train signal) from crank angle sensor 110; an injection quantity ratio calculating section 220 that calculates a ratio between the injection quantities at the first fuel injection and at the second injection in accordance with an engine speed or calculates a rate of the first injection quantity to the total (gross) fuel injection quantity which is the sum of the injection quantities of the first and second fuel injections; and a fuel injector drive section 230 that generates and outputs drive pulses so that the gasoline fuel injections through fuel injector 100 are controllably carried out at the first and second fuel injections per a combustion cycle.

In ECU 200 in FIG. 11, rpm calculating section 210 calculates the engine speed on the basis of the crank angle sensor signal and outputs the calculated engine speed to the injection quantity rate calculating section 220.

The injection quantity ratio calculating section 220 determines the injection quantity ratio between the injection quantities at the first injection and at the second fuel injection by calculating the ratio using a calculation equation previously stored in a memory such as RAM or ROM on the basis of the engine speed calculated by means of rpm calculating section 210 or by searching an injection quantity ratio map previously stored in the memory on the basis of the engine speed calculated by rpm calculating section 210 in accordance with the engine speed.

Fuel injector drive section 230 sets the timing of the first fuel injection during the minus valve O/L interval and sets the timing of the second fuel injection during either the suction stroke or the subsequent compression stroke.

Fuel injector valve drive section 230 receives signals (not shown) from the intake-air quantity sensor and accelerator opening angle sensor (not shown) to calculate the gross fuel injection quantity which is a sum of the injection quantities of the first and second fuel injections per combustion cycle and divides the gross quantity into the respective injection quantity at the first fuel injection and at the second injection in accordance with injection quantity ratio calculating section 22.

Fuel injection pulses in accordance with each injection quantity is outputted to fuel injection valve 100. The ratio of the first and second fuel injection quantities may be varied in accordance with the engine speed.

ECU 200 includes the microprocessor (as shown in FIG. 1B) and its control program although it may be constituted by a wired logic.

It is noted that the compression ratio of the compression self-ignition gasoline internal combustion engine, in the third embodiment, is set to have a relatively high compression ratio equal to or above 12 in order to make the gasoline compression self-ignition driving possible.

FIG. 12 shows a valve timing diagram of intake valve 60 and exhaust valve 70.

The valve closure timing of exhaust valve 70 is set to be closed at an earlier timing than the exhaust stroke top dead center (TDC) and the valve open timing of intake valve 60 is opened at a later timing than the exhaust stroke top dead center.

Thus, the minus (valve) O/L interval during which both of intake and exhaust valves 60 and 70 are closed is present before and after the exhaust stroke top dead center TDC.

At this time, since exhaust valve 70 is closed at a timing earlier than the upper top dead center, the gas after the combustion which is not exhausted from the corresponding combustion chamber is tightly closed in the combustion chamber and is compressed by means of piston 30.

The originally high-temperature gas after the combustion becomes further high temperature due to the compression action of piston 30. If fuel is directly injected as the first fuel injection through fuel injector 100 into the combustion chamber under such an atmosphere as described above, the combustion chamber is exposed to a high temperature together with the gas after the combustion within the combustion chamber and the reformation of fuel is advanced.

The fuel, at this time, breaks its chain of molecules to form radicals and the reaction is advanced to aldehyde with a combustion of a slight quantity of oxygen left in the gas after the combustion.

Such a fuel reformation as described above causes the ignitability of air-mixture fuel including gasoline having a low ignitability by nature to be improved. Consequently, a stable self-ignition drive can be achieved.

FIGS. 13A through 15B graphs representing the combustion stability and fuel consumption in a case where the rate of the injection quantity at the first fuel injection quantity to the gross fuel injection quantity is varied at times of a low-engine-speed region, a middle-engine-speed region, and a high-engine-speed region as will be described later. It is noted that, in these figures of FIGS. 13A through 15B, the combustion stability becomes better as each graph on the combustion stability goes in a downward direction as viewed from each of FIGS. 13A through 15B.

FIGS. 13A and 13B integrally show the relationship of the rate of injection quantity at the first injection carried out during the minus O/L interval to the gross injection quantity to the combustion stability and to the fuel consumption in a case where the second fuel injection (start) timing is set during either the suction stroke or the compression stroke and the engine speed is as low as 600 rpm (viz., a low-engine-speed region including an engine idling speed).

Since, in the case of such a low-engine-speed region as described above, the self-ignition drive can easily be achieved, the fuel injection quantity at the first injection indicates zero or equal to or below 10% during the minus valve O/L interval to promote the self-ignition combustion. In this case, the combustion stability and fuel consumption indicate an optimum value.

In a case where the injection quantity at the first injection carried out during the minus valve O/L interval is more than 10%, the fuel deformation is too advanced during the minus valve O/L interval. The thermal generation is further involved. Therefore, a main combustion to be started at a later half of the compression stroke indicates a lean combustion. Consequently, the combustion stability is worsened and the fuel consumption is also worsened.

FIGS. 14A and 14B integrally show the relationship of the rate of fuel injection quantity at the first injection carried out during the minus valve O/L interval to the gross injection quantity to the combustion stability and the fuel injection in a case where the second fuel injection timing is carried out during either the suction stroke or the compression stroke and the engine speed is as middle as 1200 rpm (under a middle-engine-speed region).

Since, in such a middle-engine-speed region as described above, the self-ignition combustion cannot be achieved as early as the case of the low-engine-speed region, the injection quantity to be injected during the minus valve O/L interval is needed to some degree.

In the third embodiment, the rate of fuel injection quantity injected at the first injection to the gross injection quantity in the middle-engine-speed region is set from 15% to 45%. Hence, it will be appreciated that the combustion stability and fuel combustion indicate an optimum value.

In a case where the rate of injection quantity is less than 15%, the self-ignition combustion is not stable and the combustion is worsened.

On the other hand, in a case where the rate of injection quantity is more than 45%, the combustion stability is not too worsened but a cooling loss is reduced due to the thermal generation during the minus O/L interval. Consequently, the fuel consumption is worsened.

FIGS. 15A and 15B integrally show the relationship of the rate of injection quantity injected at the first injection carried out during the minus valve O/L interval to the gross injection quantity in a case where the second fuel injection timing is set during either the suction or compression stroke and the engine speed is as high as 2400 rpm (under a high-engine-speed region).

Since, in such a high-engine-speed region as described above, a time interval from the fuel injection time to the combustion time is shortened, it becomes difficult to achieve the self-ignition combustion. A large quantity of fuel to be injected during the minus O/L interval is needed to promote the self-ignition combustion.

In a case where the rate of the first fuel injection is set to be equal to or larger than 40% during the high-engine-speed region, both of the combustion stability and the fuel consumption indicate optimum values.

On the other hand, in a case where the rate of fuel injection quantity injected at the first injection is below 40%, the stable self-ignition drive cannot be achieved.

Since the control over the self-ignition combustion in accordance with the engine revolution is carried out only through the control over the fuel injection quantity, there is no rise in the manufacturing cost and maintenance cost to be equipped with the well-known continuously variable valve timing mechanism.

In addition, since the present invention is applicable to the conventional internal combustion engine by the modification of fuel injection control circuitry or fuel injection control program, it is relatively easy to accommodate with the present invention to the conventional internal combustion engine.

Fourth Embodiment

Figure 16:
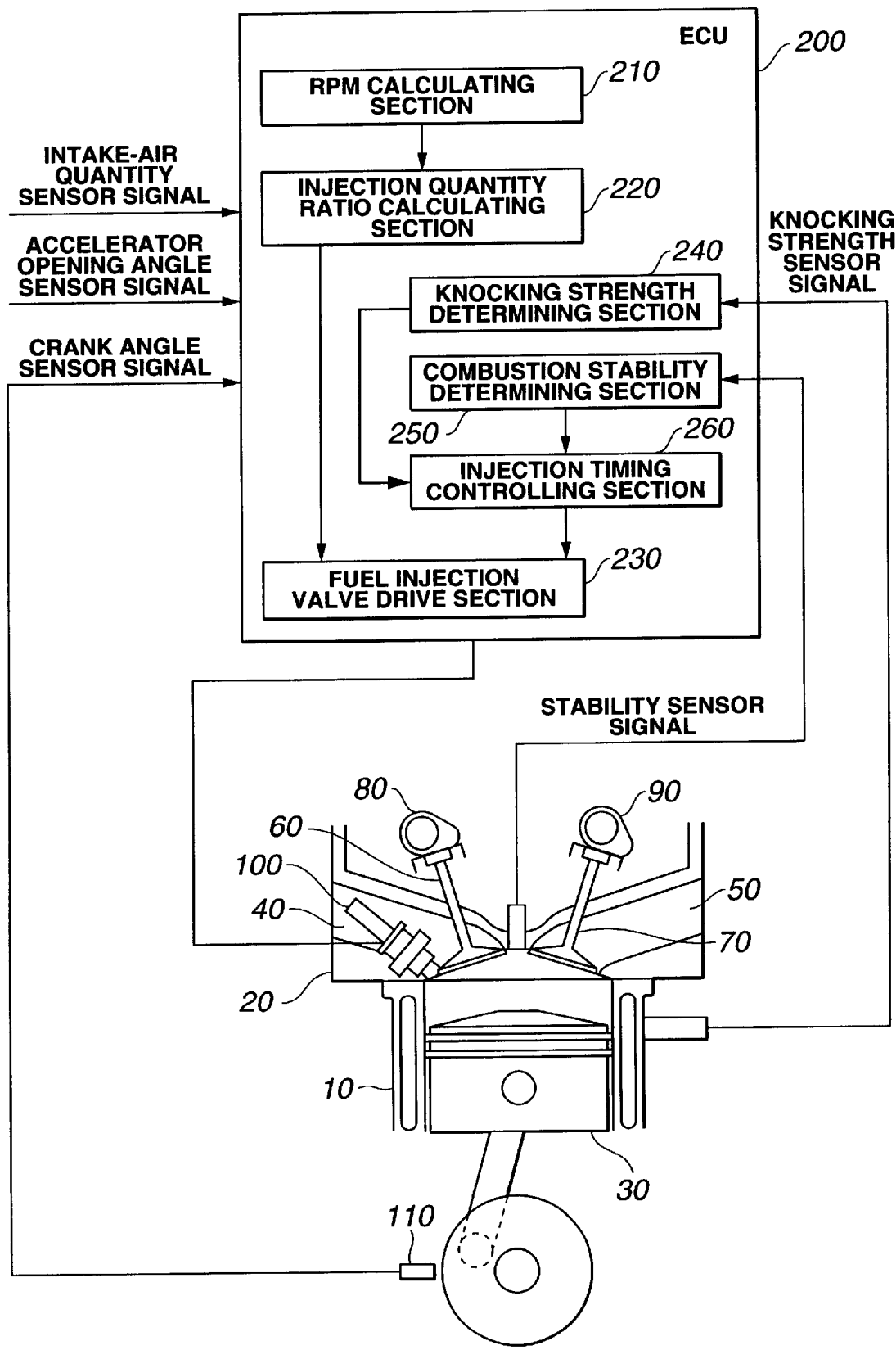
FIG. 16 is a schematic circuit block diagram of the compression self-ignition gasoline internal combustion engine in a fourth preferred embodiment according to the present invention.

FIG. 16 shows a fourth preferred embodiment of the compression self-ignition internal combustion engine according to the present invention.

In the fourth embodiment, ECU 200 may include a knocking strength determining section 240; a combustion stability determining section 250; and an injection timing controlling section 260 in addition to knocking strength sensor 120 and combustion stability sensor 130 described in the third embodiment.

Knocking strength sensor 120 may be a G (Gravity) sensor to detect an acceleration caused by vibrations on cylinder 10 or on cylinder head 20 or may be an in-cylinder pressure sensor to measure a pressure within cylinder 10.

Stability sensor 130 may be a G (gravity) sensor to detect the acceleration caused by the vibration or may be the in-cylinder pressure sensor to measure pressure within cylinder 10. It is noted that the detection of combustion stability may be carried out by detecting variations in pulse repetition intervals of the crank angle sensor signal derived from crank angle sensor 110.

Knocking strength determining section 240 determines whether the strength of the knocking is in excess of a certain limit strength on the basis of the signal derived from crank angle sensor 110.

Combustion stability determining section 250 determines whether the combustion stability detected by stability sensor 130 is in excess of a certain stability upper limit.

Fuel injection timing controlling section 260 varies the first fuel injection (start) timing in accordance with a result of determination by either knocking strength determining section 240 or combustion stability determining section 250.

In the fourth embodiment, in a case where the self-ignition drive is carried out, knocking strength sensor 120 detects the knocking strength by means of knocking strength sensor 120. Knocking strength determining section 240 determines whether the detected knocking strength is in excess of a certain set limit. If exceeded, injection timing controlling section 260 retards the injection timing of the first injection during the minus valve O/L interval.

An interval of fuel deformation during the minus valve O/L interval simultaneously elongates a preparation time interval of the knocking. The retardation of the fuel injection timing causes the preparation interval of knocking to be shortened so that the strength of knocking is relieved. In this case, since it is not necessary to vary the rate of fuel injection quantity at the first and second fuel injection quantities, no influence is given to the fuel consumption and combustion stability.

In the fourth embodiment, stability sensor 130 detects combustion stability and combustion stability determining section 250 determines whether the detected stability is in excess of the certain stability upper limit.

If combustion stability determining section 250 determines that the detected stability is in excess of the certain stability upper limit, fuel injection timing controlling section 260 advances the timing of the first fuel injection during the minus valve O/L interval. If the fuel deformation time interval to promote the self-ignition drive becomes long so that the self-ignition combustion becomes stable. In this case, since it is not necessary to vary the rate of the first and second fuel injection quantities, no influence is given to the fuel consumption and the combustion stability.

Figure 17:
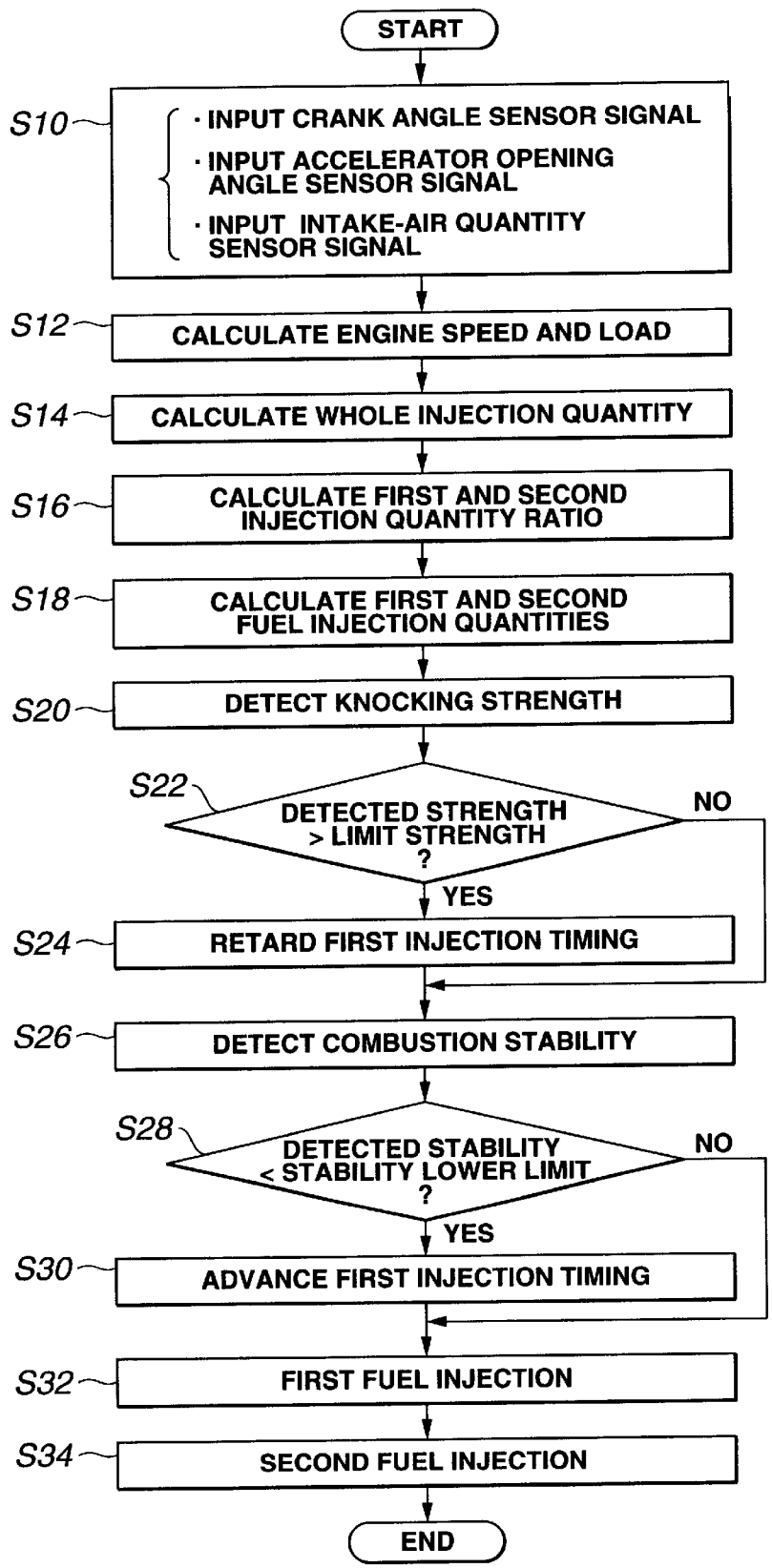
FIG. 17 is an operational flowchart representing a fuel injection control procedure in the case of the fourth embodiment shown in FIG. 16.

FIG. 17 shows an operational flowchart for explaining an operation of the fourth embodiment of the compression self-ignition gasoline internal combustion engine.

At a step S10, ECU 200 inputs the crank angle sensor signal, accelerator opening angle signal, and intake-air quantity sensor signal.

At a step S12, ECU 200 calculates the engine speed and the engine load on the basis of the input various sensor signals.

At a step S14, ECU 200 calculates the whole (gross) fuel injection quantity per combustion cycle from the engine speed and engine load.

Next, ECU 200 calculates the ratio between the fuel injection quantities injected at the first injection and at the second injection according to the engine speed at a step S16.

This ratio is derived by using the previously stored calculation equation or by searching the ratio from the previously stored map.

Next, at a step S18, ECU 200 calculates the first injection quantity and the second injection quantity from the gross injection quantity and injection quantity ratio.

Next, at a step S20, ECU 200 detects the knocking strength by means of knocking strength sensor 120.

At the next step S22, ECU 200 determines whether the detected knocking strength is in excess of a predetermined strength limit.

If Yes (exceeding) at step S22, the routine goes to a step S24 at which ECU 200 sets the first fuel injection (start) timing to be retarded. If No (not exceeding) at step S22, the routine jumps to a step S26.

At step S26, ECU 200 detects the combustion stability by means of stability sensor 130.

At the next step S28, ECU 260 determines if the detected stability is below a stability lower limit.

If No (not below) at step S28, the routine jumps to a step S32. If Yes (below) at step S28, the routine goes to a step S30 at which ECU 200 sets the first fuel injection timing to be advanced.

At step S32, ECU 200 performs the first fuel injection at the set fuel injection (start) timing which is during the minus valve O/L interval.

At a step S34, ECU 200 performs the second fuel injection during either the suction stroke or the compression stroke.

Since, in the fourth embodiment, knocking strength sensor 120 and combustion stability sensor 130 are used to always monitor the combustion state in each cylinder and the fuel injection timings are advanced or retarded immediately when each or both of the knocking strength and combustion stability are in excess of its or their limits for the combustion state to be returned to the normal combustion state, the compression self-ignition gasoline internal combustion engine in the fourth embodiment can cope with the transient drive state with favorable response characteristic.

In addition, it becomes possible to achieve the stable self-ignition combustion with favorable fuel consumption under every drive condition.

It is noted that although each of FIGS. 1A, 7, 11, and 16 shows a representative single cylinder structure, the present invention is, of course, applicable to any other cylinders of the compression self-ignition gasoline internal combustion engine since the structure thereof is the same and valve numbers of the intake and exhaust valves may be plural.

The entire contents of Japanese Patent Applications No. Heisei 11-264520 filed in Japan on Sep. 17, 1999 and 2000-015731 filed in Japan on Jan. 15, 2000 are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A compression self-ignition gasoline internal combustion engine, comprising:
    a fuel injector through which gasoline fuel is injected uninterruptedly within a combustion chamber of an engine cylinder;
    a piston of the engine cylinder whose compression action causes a mixture of air with gasoline fuel within the combustion chamber to be self-ignited;
    an intake valve whose open timing is set to a mid-way point through a suction stroke of the piston;
    an exhaust valve whose closure timing is set to a mid-way point through an exhaust stroke thereof; and
    a fuel injection controlling section that controls gasoline fuel injection timing and quantity per a combustion cycle injected through the fuel injector in such a manner as to set a first gasoline fuel injection to be carried out during a minus valve overlap interval during which both of the exhaust and intake valves are closed and as to set a second gasoline fuel injection to be carried out during at least one of the suction stroke and the subsequent compression stroke.

2. A compression self-ignition gasoline internal combustion engine as claimed in claim 1, wherein the fuel injection controlling section sets the injection timing of the first gasoline fuel injection to a time point immediately after the closure timing of the exhaust valve under a low-engine-load condition which is lower than a predetermined load.

3. A compression self-ignition gasoline internal combustion engine as claimed in claim 1, wherein the fuel injection controlling section sets the injection timing of the first gasoline fuel injection to a time point during a time interval from a time immediately after the closure timing of the exhaust valve up to a time at which the piston has reached to an exhaust stroke top dead center under an engine load condition from a middle-engine-load which is equal to or higher than a first predetermined load but lower than a second predetermined load to a high-engine-load which is higher than the second predetermined load and in which a compression self-ignition combustion drive is possible.

4. A compression self-ignition gasoline internal combustion engine as claimed in claim 1, wherein the fuel injection controlling section sets the first fuel injection not to be carried out but sets the second fuel injection to be carried out during the suction stroke, the fuel injection quantity at the second fuel injection corresponding to a whole gross injection quantity required per the combustion cycle under a high-engine-load condition which is higher than a predetermined load.

5. A compression self-ignition gasoline internal combustion engine as claimed in claim 1, wherein the fuel injection controlling section sets the injection timing of the second fuel injection to a time point immediately after the open timing of the intake valve during the suction stroke of the piston.

6. A compression self-ignition gasoline internal combustion engine as claimed in claim 1, wherein the fuel injection controlling section sets the injection quantity of the second fuel injection to be carried out during the suction stroke to a quantity which is equal to or larger than a half a gross injection quantity which is a sum of each injection quantity of the first and second injections.

7. A compression self-ignition gasoline internal combustion engine as claimed in claim 1, wherein the fuel injection controlling section sets a rate of the injection quantity of the first fuel injection quantity to a gross fuel injection quantity which is a sum of the injection quantities at the first and second injections to 15 through 45% under a low-engine-load condition which is lower than a predetermined load.

8. A compression self-ignition gasoline internal combustion engine as claimed in claim 7, wherein the fuel injection controlling section sets the rate of the injection quantity of the first fuel injection to the gross injection quantity in such a manner that the rate is decreased as an engine load is increased under an engine load condition from a low-engine-load condition which is lower than a predetermined load to a high-engine-load condition which is higher than another predetermined load and in which a compression self-ignition combustion is still possible.

9. A compression self-ignition gasoline internal combustion engine as claimed in claim 1, further comprising a combustion stability detector to detect a combustion stability of gasoline fuel injected into the combustion chamber and wherein the fuel injection controlling section sets a rate of injection quantity of the first fuel injection to a gross injection quantity which is a sum of the injection quantities of the first and second fuel injections in such a manner that the rate is increased when the combustion stability detector detects an unstable combustion stability thereof.

10. A compression self-ignition gasoline internal combustion engine as claimed in claim 1, further comprising a knocking strength detector to detect a strength of knocking within the engine cylinder and wherein the fuel injection controlling section sets a rate of the injection quantity of the second fuel injection to a gross injection quantity which is a sum of the injection quantities of the first and second injections in such a manner that the rate is increased when the knocking strength detector detects that the strength of knocking is in excess of a predetermined value.

11. A compression self-ignition gasoline internal combustion engine as claimed in claim 1, further comprising a knocking strength detector to detect a strength of knocking in the engine cylinder and wherein the fuel injection controlling section sets the timing of the first fuel injection to be retarded when the knocking strength detector detects that the strength of knocking is in excess of a predetermined strength of knocking.

12. A compression self-ignition gasoline internal combustion engine as claimed in claim 1, wherein the fuel injection controlling section sets the first and second fuel injections to be carried out per the same combustion cycle and varies a ratio of the injection quantity of the first fuel injection to that of the second fuel injection in accordance with an engine speed.

13. A compression self-ignition gasoline internal combustion engine as claimed in claim 1, wherein the fuel injection controlling section sets the first and second fuel injections to be carried out per the same combustion cycle and increases a ratio of the injection quantity of the first fuel injection to a gross injection quantity which is a sum of the injection quantities of the first and second fuel injections as an engine speed is increased.

14. A compression self-ignition gasoline internal combustion engine as claimed in claim 13, wherein the fuel injection controlling section sets the rate of the injection quantity of the first fuel injection to the gross injection quantity to a value of rate equal to or lower than 10% the gross injection quantity under a low-engine-speed region which is lower than a predetermined engine speed and including an engine idling speed.

15. A compression self-ignition gasoline internal combustion engine as claimed in claim 13, wherein the fuel injection controlling section sets the rate of the injection quantity of the first fuel injection to the gross injection quantity to a value of rate ranging from 15% to 45% of the gross injection quantity under an engine speed region from a low-engine-speed region which is lower than a first predetermined engine speed to a middle-engine-speed region which is equal to or higher than the first predetermined engine speed but is lower than a second predetermined engine speed.

16. A compression self-ignition gasoline internal combustion engine as claimed in claim 13, wherein the fuel injection controlling section sets the rate of the injection quantity of the first fuel injection to a value of rate equal to or larger than 40% the gross injection quantity under an engine speed region from a middle-engine-speed region which is equal to or higher than a predetermined speed but is lower than another predetermined speed to a high-engine-speed region which is equal to or higher than the other predetermined engine speed.

17. A compression self-ignition gasoline internal combustion engine as claimed in claim 13, further comprising a knocking strength detector to detect a strength of knocking in the engine cylinder and wherein the fuel injection controlling section retards the injection timing of the first fuel injection when the knocking strength detector detects that the detected knocking strength is in excess of a predetermined allowable limit.

18. A compression self-ignition gasoline internal combustion engine as claimed in claim 13, further comprising a combustion stability detector to detect a combustion stability of the mixture of gasoline fuel and wherein the fuel injection controlling section sets the injection timing of the first fuel injection to be advanced when the combustion stability detector detects that the combustion stability is in excess of a predetermined allowable limit.

19. A compression self-ignition gasoline internal combustion engine, comprising:
fuel injection means for directly injecting gasoline fuel into a combustion chamber of each engine cylinder;
piston means whose compression action causes a mixture of air with gasoline fuel within the combustion chamber to be self-ignited;
intake valve means whose open timing is set to a mid-way point through a suction stroke of the piston means in a corresponding engine cylinder;
exhaust valve means whose closure timing is set at a mid-way point of an exhaust stroke;
fuel injection timing setting means for setting a timing of a first fuel injection carried out through the fuel injection means to a time point during a minus valve overlap interval during which both of intake and exhaust valves of each engine cylinder are closed and for setting that of a second fuel injection carried out through the fuel injection means to a time point during at least one of the suction stroke and the subsequent compression stroke, whereby the first and second fuel injections are carried out through the fuel injection means within the same combustion cycle.

20. A method applicable to a compression self-ignition gasoline internal combustion engine, comprising:
providing a fuel injector through which gasoline fuel is injected uninterruptedly within a combustion chamber of an engine cylinder;
providing a mixture of air and gasoline fuel within the combustion chamber to be self-ignited through a compression action of a piston of the engine cylinder;
providing an intake valve whose open timing is set to a mid-way point through a suction stroke of the piston;
providing an exhaust valve whose closure timing is set to a mid-way point through an exhaust stroke thereof; and
controlling gasoline fuel injection timing and quantity per combustion cycle injected through the fuel injector in such a manner that a first gasoline fuel injection is set during a minus valve overlap time interval during which both of exhaust and intake valves are closed and a second gasoline fuel injection is set during at least one of the suction stroke and the subsequent compression stroke.

* * * * *